US012752593B2

(12) United States Patent
Nagashima et al.

(10) Patent No.: US 12,752,593 B2
(45) Date of Patent: Oct. 6, 2026

(54) STEERING DEVICE

(71) Applicant: TOYO DENSO KABUSHIKI KAISHA, Tokyo (JP)

(72) Inventors: Yosuke Nagashima, Tsurugashima (JP); Takahisa Shirakawa, Tsurugashima (JP); Yoji Ishii, Tsurugashima (JP); Shigeki Ikeshita, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/960,121

(22) Filed: Nov. 26, 2024

(65) Prior Publication Data

US 2025/0178405 A1 Jun. 5, 2025

(30) Foreign Application Priority Data

Nov. 30, 2023 (JP) ................................ 2023-203158

(51) Int. Cl.
*B60H 1/00* (2006.01)
*B60Q 3/82* (2017.01)
(Continued)

(52) U.S. Cl.
CPC .......... *B60H 1/00735* (2013.01); *B60Q 3/82* (2017.02); *B62D 1/046* (2013.01); *G06F 3/02* (2013.01)

(58) Field of Classification Search
CPC ...... B60K 35/10; B60K 35/21; B60K 35/212; B60K 35/22; B60K 35/60; B60K 35/81;
(Continued)

(56) References Cited

U.S. PATENT DOCUMENTS 4,438,425 A * 3/1984 Tsuchida .............. B60R 16/027
74/552
10,304,333 B2 * 5/2019 Engel .................... H04W 4/029
(Continued)

FOREIGN PATENT DOCUMENTS

CN 219707088 U * 9/2023
JP 2009135059 A 6/2009
JP 2011255877 A 12/2011

OTHER PUBLICATIONS

English translation of CN-219707088 (Year: 2023).*

*Primary Examiner* — Brandon Z Willis
(74) *Attorney, Agent, or Firm* — Keating & Bennett, LLP

(57) ABSTRACT

In a steering device that enhances operability while ensuring a preferred appearance, a plurality of operation switches that include light emitting portions that can be switched on and off individually, and are used for operating functions installed in a vehicle are disposed on a wheel unit of the steering device. The operation switches can be individually operated through the design panel. The design panel includes a design surface that transmits light of the switched-on light emitting portions and makes the visibility of the switched-off light emitting portions lower than that in an on-state. A function having a high operation possibility is determined based on at least one piece of information among user's operation information, environment information, driving information, and vehicle position information, and the light emitting portions associated with the determined function having a high operation possibility are switched on.

4 Claims, 5 Drawing Sheets

(51) Int. Cl.
*B62D 1/04* (2006.01)
*G06F 3/02* (2006.01)

(58) Field of Classification Search
CPC ...... B60K 2360/143; B60K 2360/1446; B60K 2360/139; B60K 2360/34; B60K 2360/345; B60K 2360/782; G06F 3/02; B60Q 1/0076; B60Q 1/0082; B60Q 3/283; B60Q 3/70; B60Q 3/80; B60Q 3/82; B62D 1/04; B62D 1/046; B60H 1/0065; B60H 1/00735; B60H 1/00785
See application file for complete search history.

(56) References Cited

U.S. PATENT DOCUMENTS

| | | | | |
|---|---|---|---|---|
| 2008/0011595 | A1* | 1/2008 | Saito | H01H 23/025<br>200/310 |
| 2009/0140994 | A1* | 6/2009 | Tanaka | H01H 13/83<br>345/173 |
| 2015/0183481 | A1* | 7/2015 | Tetsuka | G09G 3/3406<br>180/219 |
| 2016/0159396 | A1* | 6/2016 | Watanabe | B62D 15/029<br>701/36 |

* cited by examiner

STEERING DEVICE

BACKGROUND OF THE INVENTION

Field of the Invention

The present technology relates to a steering device.

Description of the Related Art

In the field of vehicles, there is a known input device including operation switches that can be individually switched on and off, and can be individually operated. Japanese Laid-open Patent Publication (Kokai) No. 2011-255877 discloses an input device that has switch operation surfaces for operating in-vehicle devices and includes illumination functions (light emitting portions) for the respective switch operation surfaces. In this input device, a switch operation surface is illuminated when an operation for operating the switch operation surface is detected. For example, a switch operation surface is illuminated, as a trigger due to approach to or contact with the switch operation surface, an amount of pullout of a seat belt, a steering angle of the steering wheel, a weight shift, or the like.

Also, Japanese Laid-open Patent Publication (Kokai) No. 2009-135059 discloses a technique for changing the illumination positions of display units with movement of a finger on a display panel on which a plurality of the display units is formed. The technique disclosed in Japanese Laid-open Patent Publication (Kokai) No. 2009-135059 may be applied to a steering device.

In terms of operability, the light emitting portions of operation switches are preferably always on. However, switching on and off of the light emitting portions affects the external appearance. In view of this, there is room for improvement in ensuring of a preferred appearance and enhancement of operability.

SUMMARY OF THE INVENTION

The present invention enhances operability while ensuring a preferred appearance.

Accordingly, an embodiment of the present invention provides a steering device for steering a vehicle, the steering device including: a rim unit that is gripped at a time of steering; a wheel unit that is located on the inner side of the rim unit; a plurality of operation switches that are disposed on the wheel unit, each of the operation switches including a light emitting portion capable of being individually switched on and off, each of the operation switches being used for operating a function installed in the vehicle; a design panel; an acquisition unit that acquires at least one piece of information among user's operation information, environment information, driving information, and vehicle position information; a determination unit that determines a function having a high operation possibility, on the basis of the information acquired by the acquisition unit; and a control unit that controls the light emitting portion, in which the operation switches are individually operable via the design panel, the design panel includes a design surface that transmits light of the light emitting portion in an on-state and makes the visibility of the light emitting portion in an off-state lower than the visibility in the on-state, and the control unit switches on the light emitting portion associated with the function having the high operation possibility determined by the determination unit.

According to the present invention, it is possible to enhance operability while ensuring a preferred appearance.

Further features of the present invention will become apparent from the following description of exemplary embodiments with reference to the attached drawings.

DESCRIPTION OF THE EMBODIMENTS

The following is a description of an embodiment of the present technology, with reference to the drawings.

Figure 1:
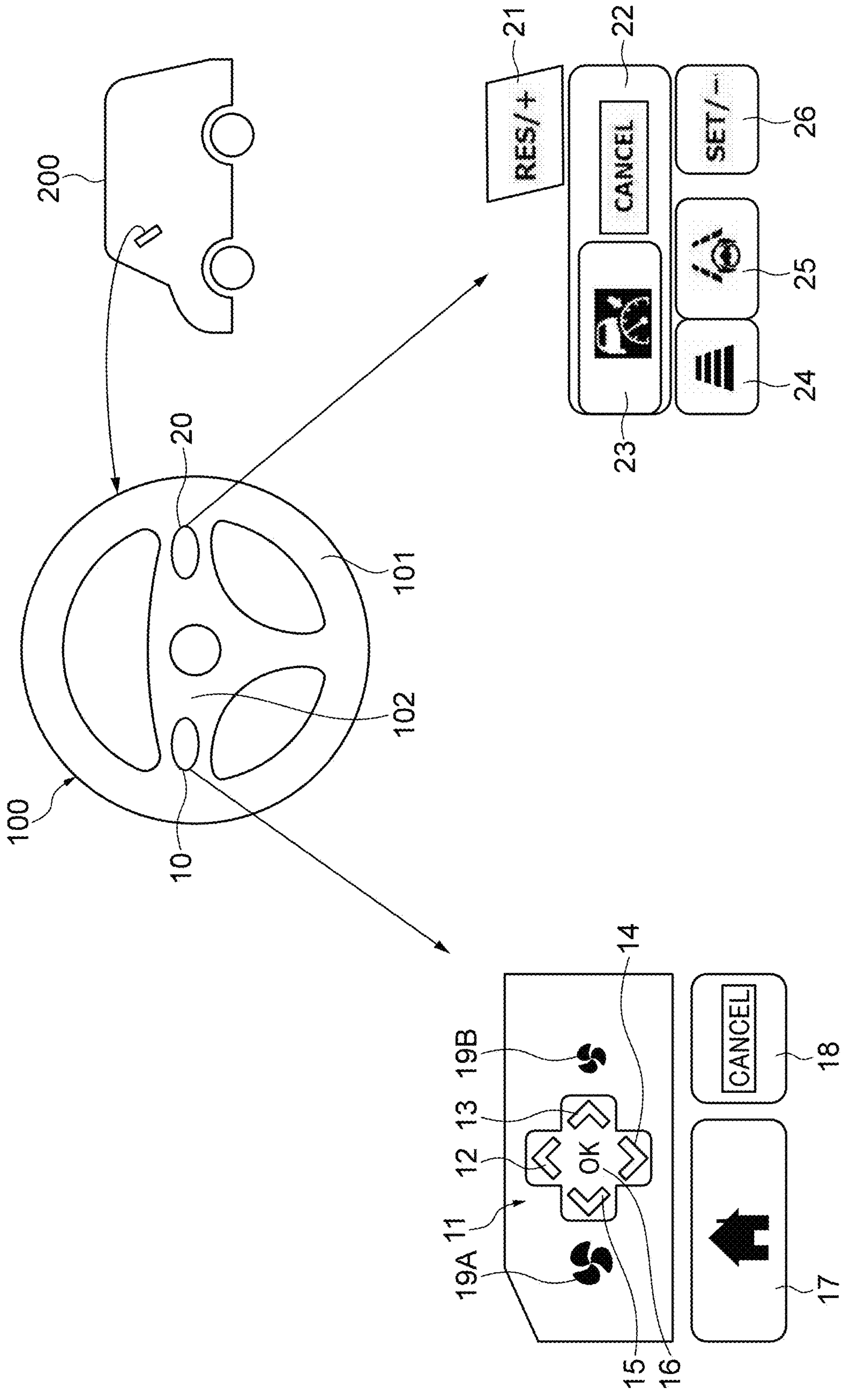
FIG. 1 is a schematic view of a steering device.

FIG. 1 is a schematic diagram of a steering device according to an embodiment of the present technology. A steering device 100 is used in a vehicle 200 as an example. The vehicle 200 is a four-wheeled vehicle, for example, but is not limited to this.

The steering device 100 is a device for steering the vehicle 200. The steering device 100 roughly includes a rim unit 101 to be gripped at a time of steering, and a wheel unit 102 located on the inner side of the rim unit 101. Steering switch groups 10 and 20 are disposed on the wheel unit 102. The steering switch group 10 is operated mainly by the left hand, and the steering switch group 20 is operated mainly by the right hand.

The steering switch groups 10 and 20 respectively include a plurality of operation switches for operating functions installed in the vehicle 200. For example, the steering switch group 10 includes operation switches 12 to 18, and the steering switch group 20 includes operation switches 21 to 26. The operation switches 12 to 16 are included in an arrow switch 11. Also, marks 19A and 19B indicating propellers are disposed on the right and left sides of the arrow switch 11.

The operation switches 12 to 18 and 21 to 26 are operated separately by the user. Although a detailed configuration will be described later with reference to FIG. 2, a symbol mark and a light emitting portion are provided in each of the operation switches 12 to 18 and 21 to 26. When the light emitting portions corresponding to the respective operation switches are turned on (to emit light), each symbol mark is visually recognized. Also, a light emitting portion is provided in each of the marks 19A and 19B, and the marks 19A and 19B are visually recognized when the corresponding light emitting portions are turned on (to emit light). That is, as the light emitting portions corresponding to the respective operation switches are turned on (to emit light) switching from a non-lighting state, and the symbol marks become visible, it is possible to achieve both ensuring of a preferred appearance and enhancement of operability.

The functions installed in the vehicle 200 include an air conditioner function, an audio function, a car navigation function, and a driving assistance function. Of these functions, which function is to be activated can be designated by a user's instruction, or may be automatically set through determination performed by a control unit 30 described later.

An example of the functions corresponding to the respective operation switches is now described. For example, the operation switches 12 to 16 of the arrow switch 11 are used for the air conditioner function, the audio function, or the car navigation function. The operation switch 16 corresponds to an OK (confirmation) button. The operation switches 12 and 14 are used to adjust sound volume and room temperature, and the operation switches 13 and 15 are used to adjust air volume and switch channels.

The operation switch 17 corresponds to a home button, has a mark indicating the home as a symbol mark, and has a function of returning a set state to the initial state. The operation switch 18 corresponds to a cancel button, has the characters of "CANCEL" as a symbol mark, and has a function of canceling a setting.

Although any example of marks is not shown in the drawing, the operation switches 21 to 26 have symbol marks corresponding to the respective functions. As an example, the operation switches 21 and 26 correspond to functions such as an increase/decrease and setting of the vehicle speed, and have character marks such as "RES/+" and "SET/−", respectively. The operation switch 22 corresponds to a setting cancellation function, and has a character mark such as "CANCEL". The operation switch 23 corresponds to a function related to a congestion tracking function (ADAS), and has a predetermined pictorial pattern as a mark. The operation switch 24 corresponds to a function related to inter-vehicle distance setting in congestion tracking, and has a predetermined pictorial pattern as a mark. The operation switch 25 corresponds to a function related to lane keeping (LKAS), and has a predetermined pictorial pattern as a mark.

It should be noted that the functions and symbol marks corresponding to the respective operation switches are not limited to the above examples.

Figure 2:
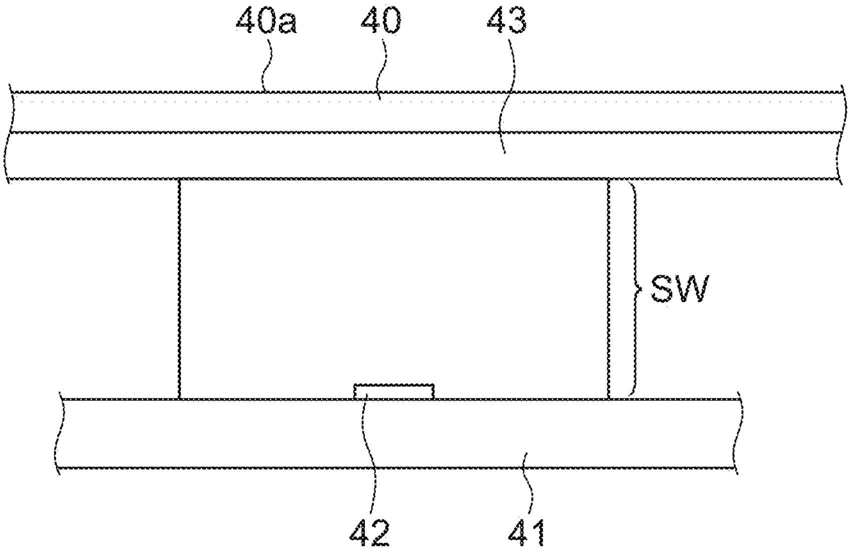
FIG. 2 is a schematic side view showing the configuration of one operation switch.

FIG. 2 is a schematic side view showing the configuration of one operation switch. The basic configurations of the operation switches 12 to 18 and 21 to 26 are the same, and therefore, the configuration of an operation switch SW is described herein as a typical configuration. "Operation switches SW" is the term for collectively referring to the respective operation switches.

The operation switch SW is disposed on a substrate 41. The operation switch SW includes a light emitting portion 42 such as an LED mounted on the substrate 41. The light emitting portion 42 of each operation switch SW can be individually turned on and off. A sheet 43 and a design panel 40 are stacked above the operation switch SW. It should be noted that the sheet 43 and the design panel 40 may be shared among a plurality of operation switches SW. The operation switches SW can be individually operated via the sheet 43 and the design panel 40.

As an example, a symbol mark is provided by forming a light transmitting portion in the shape of the symbol mark on the sheet 43 or the upper surface of the operation switch SW. Alternatively, on the contrary, a symbol mark may be provided by using only a portion other than the shape of the symbol mark as the light transmitting portion. It should be noted that places where a symbol mark is formed and methods for forming a symbol mark are not limited to them.

It should be noted that the operation switch SW may be a device that is driven by an opening/closing operation of a built-in microswitch through a pressing operation or the like, or a device that is driven when an amount of change in electrostatic capacitance that changes due to an object approaching the operation switch SW is detected and compared with a threshold.

A design surface 40*a* of the design panel 40 is designed to transmit light of the switched-on light emitting portion 42 and make the visibility of the switched-off light emitting portion 42 lower than that in an on-state. The design surface 40*a* is decorated. For example, the design surface 40*a* may be formed with at least one of a wood-grain surface, an aluminum-like surface, or a carbon-like surface. With this arrangement, an aesthetic appearance can be presented. It should be noted that the design panel 40 or the design surface 40*a* may be dark-colored and transparent. Making the visibility of the light emitting portion 42 lower than that in an on-state also includes preventing the light emitting portion from being completely visually recognized. The design surface 40*a* is disposed on the front surface of the design panel 40, but may be disposed on the back surface or may be disposed on both surfaces.

Accordingly, when the light emitting portion 42 is on, the light of the light emitting portion 42 is transmitted and reaches the user. Thus, the symbol mark is visually recognized by the user. When the light emitting portion 42 is off, the light emitting portion 42 does not emit light, and therefore, is not visible. Furthermore, since the design surface 40*a* is decorated, and the light transparency of the design panel 40 is somewhat low, the light transmitting portion in the shape of the symbol mark is less likely to be visually recognized. As a result, the symbol mark is not visually recognized, or is hardly visually recognized.

It should be noted that, under normal daytime and nighttime vehicle environment, when the light emitting portion 42 is off, the design surface 40*a* appears as a uniform surface, the presence of the operation switch SW is not recognized, and the boundary between the adjacent operation switches SW is not recognized either. The switching on and off of the light emitting portion 42 of the operation switch SW is individually controlled by the control unit 30.

It should be noted that the marks 19A and 19B (FIG. 1) are not operation switches, and therefore, are not operated. However, the marks 19A and 19B are visually recognized by light emission from light emitting portions (not shown) provided in one-to-one correspondence, and are not visually recognized when switched off. For example, the marks 19A and 19B are visually recognized (displayed) only when the air conditioner function can be operated.

That is, the arrow switch 11 (FIG. 1) is shared for an air conditioner operation, an audio operation, and a car navigation operation. In a mode in which an air conditioner can be operated, the symbol marks of the operation switches 12 to 14 on the arrow switch 11, and the marks 19A and 19B become visually recognizable. Being able to visually recognize the marks 19A and 19B, the user recognizes that the air conditioner can be operated. In a case where the marks 19A and 19B are visually recognized, the operation switches 13 and 15 correspond to lowering and raising of the air volume of the air conditioner, and the operation switches 12 and 14 correspond to raising and lowering of room temperature with the air conditioner.

On the other hand, in a mode in which an audio operation or a car navigation operation is possible, the symbol marks of the operation switches 12 to 14 are visually recognized, and the marks 19A and 19B are put into a visually unrecognizable state. In this state, the user recognizes that an audio operation or a car navigation operation is possible. As an example, in a case where the marks 19A and 19B are not visually recognized, the operation switches 12 and 14 correspond to operations of raising and lowering sound volume, and the operation switches 13 and 15 correspond to operations of scrolling back and forth of channels.

It should be noted that, although an audio operation or a car navigation operation has been described as an example, the present technology may also be used for an operation of switching displayed displays, such as switching of the display portion of a multifunctional information display unit provided on an instrument panel such as a speedometer, for example.

Figure 3:
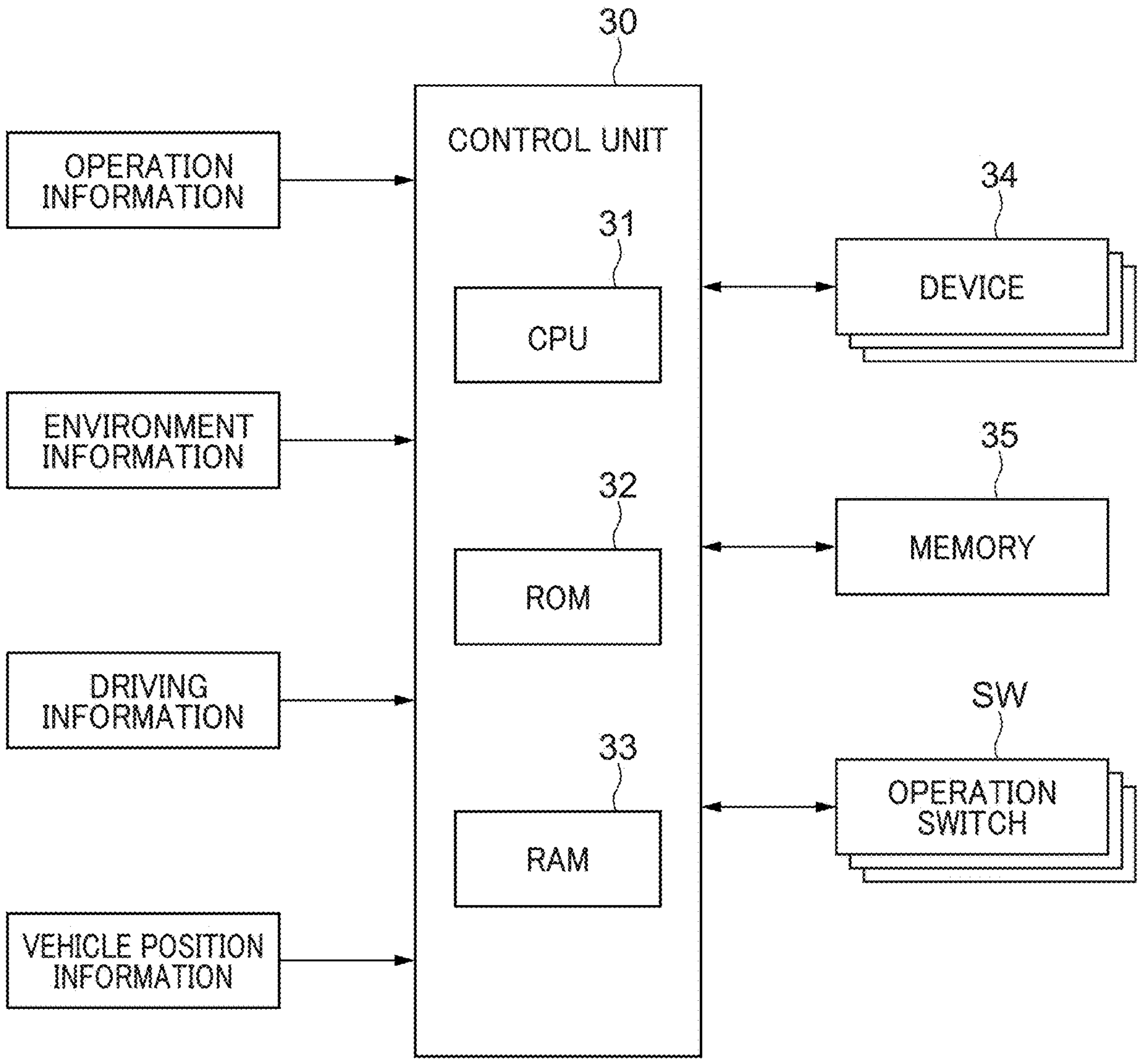
FIG. 3 is a block diagram of the steering device.

FIG. 3 is a block diagram of the steering device 100. The steering device 100 includes a plurality of devices 34 mounted on the vehicle 200, in addition to the control unit 30, a memory 35, and the plurality of operation switches SW (operation switches 12 to 18 and 21 to 26) described above. The control unit 30 includes a CPU 31, a ROM 32, and a RAM 33.

The CPU 31 controls the entire steering device 100. The ROM 32 stores a program to be executed by the CPU 31. The RAM 33 provides a work area to be used when the CPU 31 executes the program. The memory 35 is a nonvolatile memory, and stores various kinds of information.

Examples of the devices 34 include an air conditioner, a car navigation system, an audio device, and a display device. In addition to the above, the devices 34 include various devices (sensors, actuators, and the like) for implementing a driving assistance function. It should be noted that the types of the devices 34 are not limited to those mentioned as examples.

The CPU 31 receives operation inputs through the operation switches SW and detection information, and outputs drive instructions to the devices 34. An operation detection mechanism (not shown) is provided on each operation switch SW, and its operation detection result is supplied to the CPU 31. Further, the CPU 31 outputs a switching on/off instruction to the light emitting portion 42 of each operation switch SW.

The CPU 31 as an acquisition unit acquires at least one piece of information among user's operation information, environment information, driving information, and vehicle position information as the information to be used for controlling the light emitting portions 42. These pieces of information are information detected by the corresponding sensors or information acquired from the outside, and are input to the control unit 30.

First, the operation information is information indicating behaviors and operations by the user, and, as an example, includes information about the strength of a grip on the rim unit 101, information indicating the proximity to an operation switch SW, and the like. The strength of a grip on the rim unit 101 is detected by a piezoelectric sensor (not shown) provided on the rim unit 101, for example. The proximity to an operation switch SW is detected by a capacitive proximity sensor or the like (not shown) provided on the operation switch SW, for example.

The environment information is information regarding the environment outside or inside the vehicle, and includes information such as the temperature and humidity outside the vehicle, and the temperature and humidity inside the vehicle. The driving information is information regarding a driving situation and a driving operation, and includes vehicle speed. In addition to this, the driving information may include information about an accelerator operation or a brake operation. The vehicle position information is information supplied from a global navigation satellite system (GNSS) or a global positioning system (GPS), for example, and is acquired by an ECU (not shown) receiving from an external server (not shown). The information to be used for controlling the light emitting portions 42 is not limited to the above examples, and may include weather information, for example.

In addition to the above, the environment information may include time information. The operation information may include information about the user's voice, gesture, line of sight, posture, and emotion (obtained by driver monitoring). The driving information may include information about the presence or absence of parking. It should be noted that the operation information or the driving information may include a multimedia cooperating operation or switching on of the headlights.

Figure 4A:
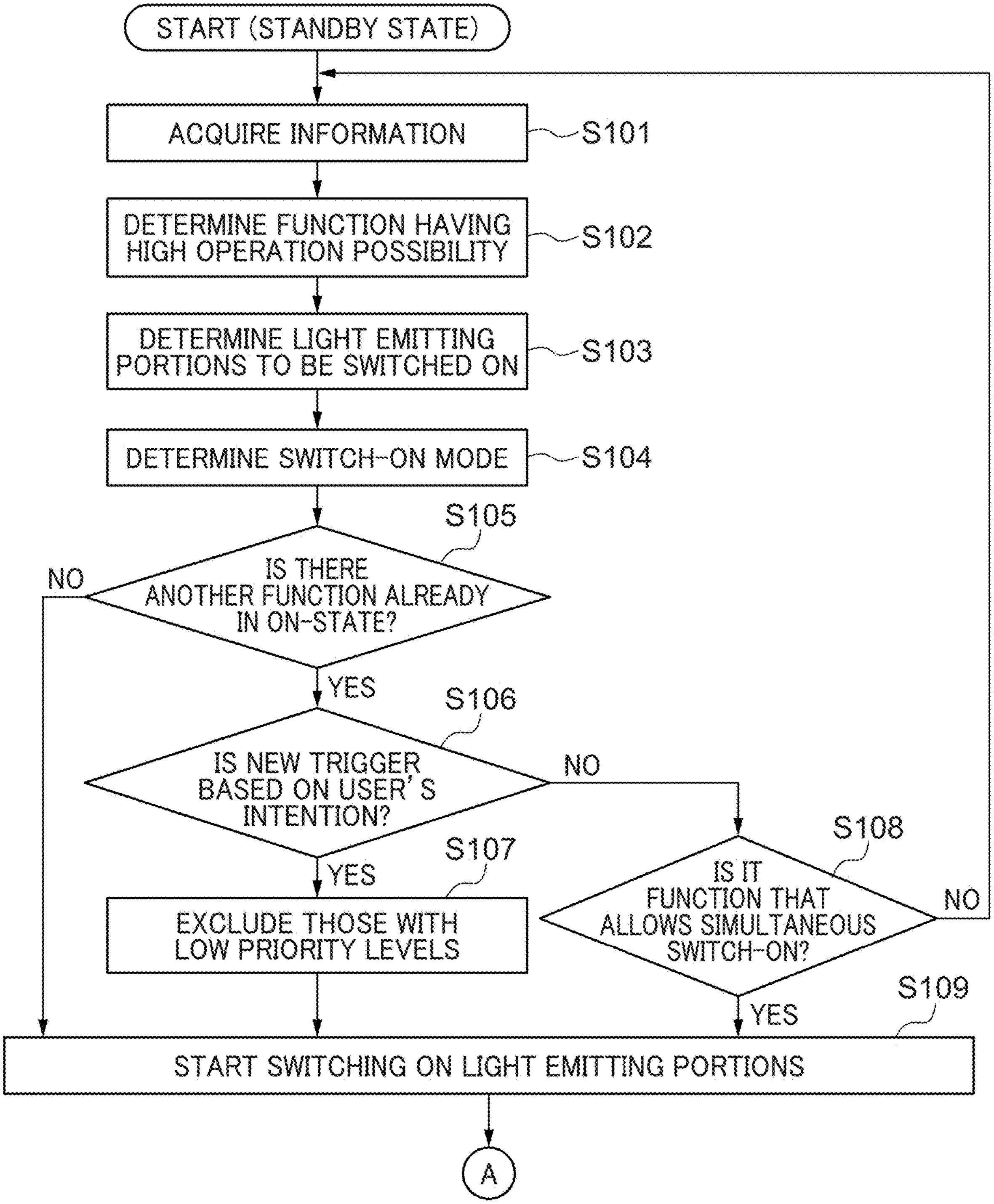
FIGS. 4A and 4B are flowcharts of a light emitting portion controlling process.
Figure 4B:
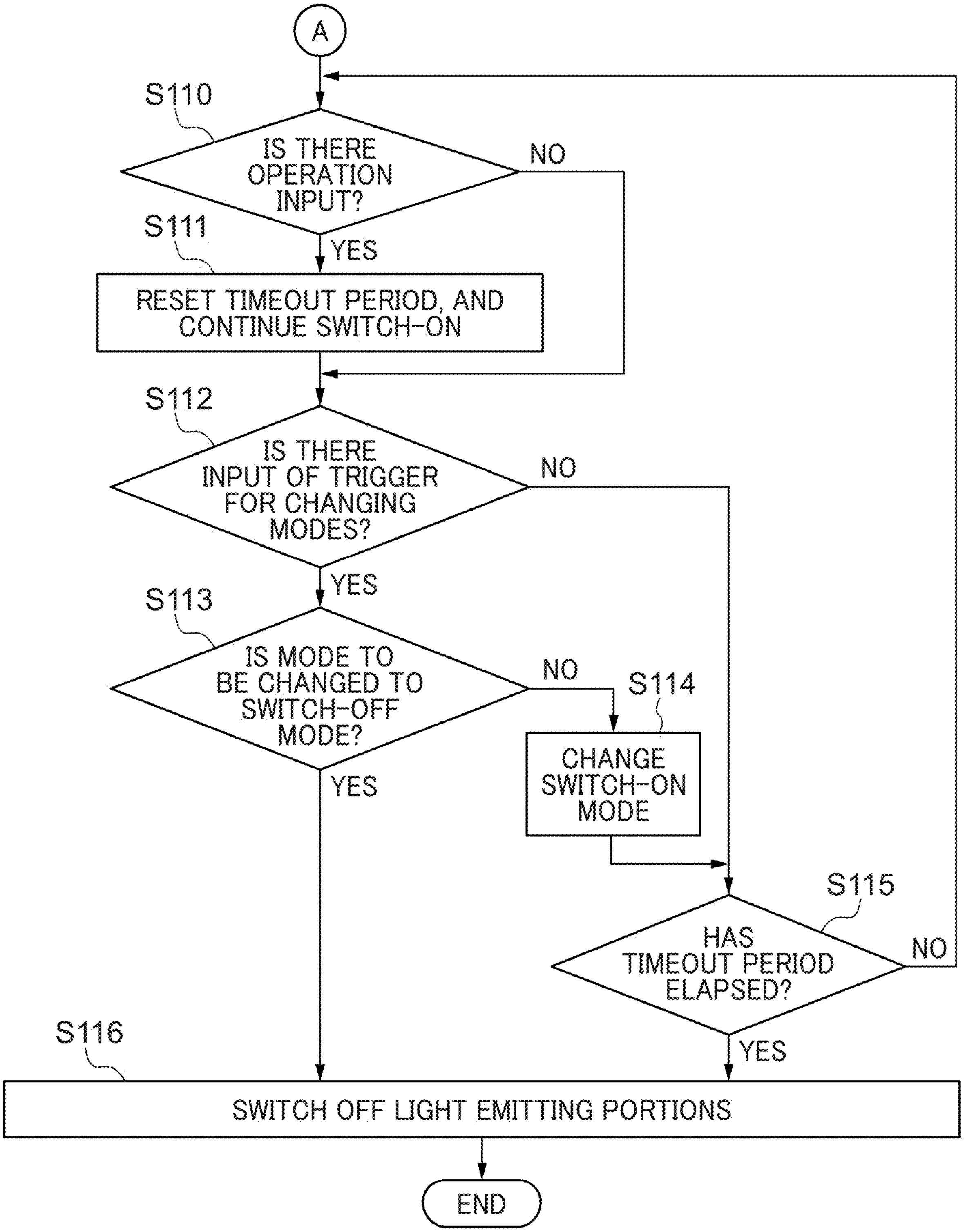

FIGS. 4A and 4B are flowcharts of a light emitting portion controlling process. This process is realized by the CPU 31 executing a program stored in the ROM 32 or the like. This process starts when a power (or engine) key is turned on, and ends when the power key is turned off. Immediately after the start of this process, the light emitting portions 42 are in an off-state.

It should be noted that, in the example shown in this flowchart, the process ends when the power key is turned off. However, even after the power key is turned off by the vehicle, the state of the vehicle can be transferred to a standby state in which a specific function can be performed or the light emitting portions are still switched on. That is, although the light emitting portions are off, the light emitting portions may be in an energized state in which a specific operation can be performed, or in a continuous on-state for the light emitting portions 42.

First, in step S101, the CPU 31 as an acquisition unit stands by until successfully acquiring the information (operation information, environment information, driving information, and vehicle position information) to be used for controlling the light emitting portions 42 (a standby state). If the CPU 31 successfully acquires the information, the process moves on to step S102.

In step S102, the CPU 31 as a determination unit determines a function with a high operation possibility on the basis of the acquired information, and outputs a signal corresponding to the determined function. Examples of the determination method to be used here include the following examples (a), (b), (c), and (d), and at least one of these examples is adopted.

In the example (a), in a case where the strength of the grip on the rim unit 101 exceeds a predetermined strength, the CPU 31 determines a predetermined specific function to be a function having a high operation possibility. The specific function mentioned here is the audio function or the car navigation function, for example. This is because, in a case where the rim unit 101 is tightly gripped, there is a possibility that the user intends to operate these functions. It should be noted that either the audio function or the car navigation function may be registered beforehand as the specific function. By adopting this determination method, it is possible to operate the specific function (the audio function or the car navigation function, for example), without adopting any other preliminary method.

In the example (b), in a case where the difference between the temperature outside the vehicle and the temperature in the vehicle exceeds a predetermined temperature (6° C., for example), the CPU 31 determines the air conditioner function to be a function with a high operation possibility. This is because, when a difference of a certain size is generated between the temperature outside the vehicle and the temperature in the vehicle, there is a high possibility that the user intends to operate the air conditioner. By adopting this determination method, it is possible to operate a specific function (the air conditioner function, for example), without adopting any other preliminary method.

It should be noted that, in addition to this, in the example (b), a function with a high operation possibility may be determined on the basis of the difference between the humidity outside the vehicle and the humidity in the vehicle.

Alternatively, a function with a high operation possibility may be determined on the basis of only the temperature in the vehicle or only the humidity in the vehicle. Alternatively, a function with a high operation possibility may be determined, with at least two factors among the temperature difference, the humidity difference, the in-vehicle temperature, and the in-vehicle humidity being comprehensively taken into consideration.

In the example (c), in a case where the vehicle speed exceeds a predetermined speed (80 km/h, for example), the CPU 31 determines the driving assistance function to be a function with a high operation possibility. This is because, when the vehicle speed is high, the possibility that the user intends to perform an operation to activate the driving assistance function such as a congestion tracking function or lane keeping is high. By adopting this determination method, it is possible to operate a specific function (the driving assistance function, for example), without adopting any other preliminary method.

In the example (d), in a case where the vehicle position information indicates that the vehicle 200 has entered an expressway, the CPU 31 determines the driving assistance function to be a function with a high operation possibility. This is because, in a case where the vehicle has entered an expressway, there is a high possibility that the user intends to perform an operation to activate the driving assistance function such as a congestion tracking function or lane keeping. By adopting this determination method, it is possible to operate a specific function (the driving assistance function, for example), without adopting any other preliminary method.

In steps S103 to S116, the CPU 31 as a control unit that controls the light emitting portions 42 performs the process.

In step S103, the CPU 31 determines the light emitting portions 42 to be switched on (to be turned on). Here, the light emitting portions 42 corresponding to the function determined to have a high operation possibility are determined to be the light emitting portions 42 to be switched on. For example, in a case where the air conditioner function is determined to be the function with a high operation possibility, the light emitting portions 42 included in the operation switches 12 to 16 correspond to the air conditioner function, and accordingly, these light emitting portions are determined to be the light emitting portions 42 to be switched on. Also, in a case where the driving assistance function is determined to be the function with a high operation possibility, the light emitting portions 42 included in the operation switches 21 to 26 correspond to the driving assistance function, and accordingly, these light emitting portions are determined to be the light emitting portions 42 to be switched on.

In step S104, the CPU 31 determines a switch-on mode, on the basis of the function determined to have a high operation possibility. Here, the modes related to light emission include the switch-on mode and a switch-off mode. The switch-on mode includes, in addition to simple switch-on, a mode of light emission such as presence or absence of blinking, emission luminance, and change in color of light. It should be noted that the switch-on mode or the switch-off mode may be designated beforehand by grouping or the like as desired by the user.

In step S105, the CPU 31 determines whether the light emitting portions 42 corresponding to some other function are already on. If the light emitting portions 42 corresponding to some other function are already on, the CPU 31 then moves on to step S106. If the light emitting portions 42 corresponding to some other function are not on, the CPU 31 moves on to step S109.

In step S106, the CPU 31 determines whether a new trigger is intended by the user. The occurrence of a "new trigger" mentioned herein means that the light emitting portions 42 to be switched on have been determined. Whether the new trigger is intended by the user is determined on the basis of the information acquired in step S101. For example, in a case where the acquired information relates to any of a grip on the rim unit 101, detection of proximity to the operation switches SW, voice, a gesture, a multimedia cooperating operation, and switching on of the headlights, it is determined that the new trigger is intended by the user, because the new trigger derives from a user operation.

If the new trigger is intended by the user, the CPU 31 then moves on to step S107. If the new trigger is not intended by the user, the CPU 31 then moves on to step S108.

In step S107, the CPU 31 excludes those having low priority levels from the light emitting portions 42 determined to be switched on. Here, the CPU 31 excludes those irrelevant to the operation intended by the user, for example. Priority levels may be determined beforehand for the respective light emitting portions 42. After that, the CPU 31 moves on to step S109.

In step S108, the CPU 31 determines whether the function determined in step S102 is a function that enables the corresponding light emitting portions 42 to be switched on at the same time. If the function is not a function that enables the corresponding light emitting portions 42 to be switched on at the same time, the CPU 31 then returns to step S101. This is because, in a case where the light emitting portions 42 determined to be switched on are switched on at once, if the light emitting portions 42 at the same position are switched on in an overlapping manner, there is a risk of confusing the driver. If the function enables the corresponding light emitting portions 42 to be switched on at the same time, on the other hand, the process moves on to step S109.

In step S109, the CPU 31 starts switching on the light emitting portions 42 corresponding to the function determined to have a high operation possibility. It should be noted that, in a case where the process has moved from step S107, only the light emitting portions 42 that have not been excluded start being switched on. At the time of switching on, the CPU 31 enables the function (allows the function to be operated with the operation switches SW). That is, in response to an output of the signal corresponding to the function determined to have a high operation possibility, the CPU 31 enables an operation of the function determined to have a high operation possibility, and starts switching on the light emitting portions 42 associated with the function.

For example, in a case where the air conditioner function is determined to be a function with a high operation possibility, the CPU 31 enables an operation of the air conditioner function and starts switching on the light emitting portions 42 of the operation switches 12 to 16 and switching on the light emitting portions 42 corresponding to the marks 19A and 19B. Further, in a case where the audio function is determined to be a function having a high operation possibility, the CPU 31 enables an operation of the audio function, and starts switching on the light emitting portions 42 of the operation switches 12 to 18. In a case where the driving assistance function is determined to be a function with a high operation possibility, the CPU 31 enables an operation of the driving assistance function, and starts switching on the light emitting portions 42 of the operation switches 21 to 26.

Here, the mode of lighting of the light emitting portions 42 is not limited to any particular one. For example, the emission luminance may be gradually increased, or may be shifted from blinking to lighting. Alternatively, the emission color may be gradually changed.

Also, a level of an operation possibility may be determined based on the acquired information, and the mode of lighting of the light emitting portions 42 may be varied depending on the determined level of the operation possibility. For example, the operation possibility may be determined to be higher when the strength of a grip on the rim unit 101 is higher. The operation possibility may be determined to be higher when the difference between the temperature outside the vehicle and the temperature in the vehicle is larger. The operation possibility may be determined to be higher when the vehicle speed is higher. Furthermore, when the operation possibility is higher, the emission luminance may be made higher, and the rate of change to be caused in luminance or emission color when the emission luminance or the emission color is changed gradually may be made higher. As the mode of lighting of the light emitting portions 42 is varied in this manner, the operable portion can be visually recognized more clearly.

It should be noted that, during this process, the CPU 31 constantly monitors operations of the operation switches SW, and stores the operated operation switches SW and the operation times into the memory 35. These processes are performed for each operation switch SW.

In step S110, the CPU 31 determines whether there is an operation input to the operation switches SW including the light emitting portions 42 switched on in step S109. If there is not an operation input to the operation switches SW including the switched-on light emitting portions 42, the CPU 31 moves on to step S112. If there is an operation input to the operation switches SW including the switched-on light emitting portions 42, the CPU 31 moves on to step S111.

In step S111, the CPU 31 resets the timeout period, and continues to switching on the light emitting portions 42 for which switching on has started. It should be noted that the timeout period is set to an initial value at the start of this process.

In step S112, the CPU 31 determines whether a trigger for changing the mode related to light emission has been input. If any trigger for changing the mode related to light emission has not been input, the CPU 31 then moves on to step S115. If a trigger for changing the mode related to light emission has been input, the CPU 31 then moves on to step S113.

In step S113, the CPU 31 determines whether the trigger for changing the mode related to light emission is a trigger for changing the mode to the switch-off mode. If the trigger for changing the mode related to light emission is a trigger for changing the mode to the switch-off mode, the CPU 31 then moves on to step S116. If not, the CPU 31 moves on to step S114.

In step S114, the CPU 31 changes the switch-on mode, based on the trigger for changing the mode related to light emission. In step S115, the CPU 31 determines whether the timeout period (predetermined period) has elapsed. If the timeout period has not elapsed, the CPU 31 then returns to step S110. If the timeout period has elapsed, the CPU 31 moves on to step S116.

In step S116, the CPU 31 starts switching off the light emitting portions 42 that have been switched on. Here, in a case where the process proceeds from step S113, the corresponding lighted light emitting portions 42 are switched off. Further, in a case where a transition from S110 to S112 to S115 to S116 has been made, the light emitting portions 42 have been switched on in accordance with intention of the user, but are left on without any operation of the corresponding operation switches SW. In this case, the corresponding lighted light emitting portions 42 are turned off.

Among the operation switches SW having the light emitting portions 42 switched on in step S109, the ones that have been operated and for which the timeout period has elapsed after the end of the operation are called the "operated switches" herein. In a case where a transition from step S110 to step S111 to step S112 to step S115 to step S116 has been made, the CPU 31 switches off the light emitting portions 42 (the light emitting portions that have been switched on) of the operated switches. In conjunction with that, in a case where there is another light emitting portion 42 that is associated with the function corresponding to the light emitting portions 42 of the operated switches and is in an on-state, the CPU 31 also switches off the other light emitting portion 42.

For example, in a case where the air conditioner function is operable, when a predetermined time elapses after a room temperature raising operation is performed by the operation switch 12, the CPU 31 switches off the light emitting portions 42 of the operation switches 12 to 16, and also switches off the light emitting portions 42 corresponding to the marks 19A and 19B. That is, when a predetermined time elapses after any one of the operation switches 12 to 16 is operated, all the light emitting portions corresponding to the air conditioner function are switched off at once. As the light emitting portions 42 are switched off in this manner after the predetermined time has elapsed, the appearance can be maintained, and power consumption by the vehicle can be reduced.

The reason for such control is that, when the predetermined time elapses after a certain operation related to the air conditioner function is performed, it can be determined that there is no intention to perform any subsequent operation related to the air conditioner function. Also, the reason is to avoid continuation of reflection of light emission on a glass surface particularly at night, for example, and to ensure a preferred appearance. Other functions are controlled in a similar manner. Thus, the light emitting portion group corresponding to the function corresponding to the operated switches is switched off at once.

It should be noted that the mode of switching off in step S116 is not limited to any particular one. For example, the emission luminance may be gradually lowered, or may be switched to an off-state via a blinking state. Alternatively, the emission color may be gradually changed at the time of switching off. After step S116, the CPU 31 returns to step S101.

According to the present embodiment, the light emitting portions 42 associated with a function determined to have a high operation possibility on the basis of acquired information such as operation information, environment information, driving information, and vehicle position information are switched on. Further, when the light emitting portion 42 of an operation switch SW is switched on, the corresponding symbol mark is visually recognized. When the light emitting portion 42 is switched off, the symbol mark is no longer visually recognized.

Accordingly, with the symbol marks, the user can visually recognize the operation switches SW to be operated, and thus, operability can be enhanced. Further, the operation switches SW having a low possibility of an intended operation are not visually recognized through the design panel 40, and thus, a preferred appearance is maintained. In particular, the design panel 40 is recognized as a uniformly flat surface, and thus, awareness of the presence of the operation switches SW is reduced. Furthermore, the design surface 40*a* of the design panel 40 is decorated with a wood-grain pattern or the like, so that the aesthetic appearance can be further enhanced. Thus, operability can be enhanced while a preferred appearance is ensured. Although a wood-grain pattern or the like has been taken as an example, the type of decoration is not limited to this, and a decoration with real wood, real leather, synthetic leather, cloth, or the like may be used, for example.

Also, the mode of switching on of the light emitting portions 42 corresponding to the function determined to have a high operation possibility is varied depending on the determined level of the operation possibility, and thus, control can be performed to make the visibility of the operation switches SW higher when the intention to perform an operation is stronger.

Also, among the operation switches SW corresponding to the light emitting portions in an on-state, the light emitting portion group corresponding to the function corresponding to the operation switches SW after a predetermined time has elapsed since last operated is turned off at once. Thus, it is possible to avoid unnecessarily ensuring visibility of the operation switches SW with low operation possibilities, and a preferred appearance can be ensured.

Although the present technology has been described in detail on the basis of preferred embodiments thereof, the present technology is not limited to these specific embodiments, and various modes within the scope of the technology are also included in the present technology.

This application claims the benefit of Japanese Patent Application No. 2023-203158 filed on Nov. 30, 2023, which is hereby incorporated by reference herein in its entirety.

What is claimed is:

1. A steering device for steering a vehicle, the steering device comprising:

a rim unit that is gripped at a time of steering;

a wheel unit that is located on an inner side of the rim unit;

a plurality of operation switches that are disposed on the wheel unit, each of the operation switches including a light emitting portion capable of being individually switched on and off, each of the operation switches being used for operating a function installed in the vehicle;

a design panel;

at least one processor and a memory coupled to the processor to store instructions that, when executed by the processor, cause the processor to function as:

an acquisition unit that acquires at least one piece of information among user's operation information, environment information, driving information, and vehicle position information;

a determination unit that determines a function having a high operation possibility, on a basis of information acquired by the acquisition unit; and a control unit that controls the light emitting portion, wherein the operation switches are individually operable via the design panel, the design panel includes a design surface that transmits light of the light emitting portion in an on-state and makes visibility of the light emitting portion in an off-state lower than visibility in the on-state, the environment information includes a temperature difference between a temperature outside the vehicle and a temperature in the vehicle, when the temperature difference exceeds a predetermined temperature, the determination unit determines an air conditioner function to be the function having the high operation possibility, and outputs a signal corresponding to the air conditioner function, and in response to the output of the signal, the control unit makes the air conditioner function operable, and switches on the light emitting portion associated with the air conditioner function.

2. The steering device according to claim 1, wherein the operation information includes a strength of a grip on the rim unit, when the strength of the grip on the rim unit exceeds a predetermined strength, the determination unit determines a predetermined specific function to be the function having the high operation possibility, and outputs a signal corresponding to the specific function, and, in response to the output of the signal, the control unit makes the specific function operable, and switches on the light emitting portion associated with the specific function.

3. A steering device for steering a vehicle, the steering device comprising:

a rim unit that is gripped at a time of steering;

a wheel unit that is located on an inner side of the rim unit;

a plurality of operation switches that are disposed on the wheel unit, each of the operation switches including a light emitting portion capable of being individually switched on and off, each of the operation switches being used for operating a function installed in the vehicle;

a design panel;

at least one processor and a memory coupled to the processor to store instructions that, when executed by the processor, cause the processor to function as:

an acquisition unit that acquires at least one piece of information among user's operation information, environment information, driving information, and vehicle position information;

a determination unit that determines a function having a high operation possibility, on a basis of information acquired by the acquisition unit; and a control unit that controls the light emitting portion, wherein the operation switches are individually operable via the design panel, the design panel includes a design surface that transmits light of the light emitting portion in an on-state and makes visibility of the light emitting portion in an off-state lower than visibility in the on-state, the driving information includes a vehicle speed, when the vehicle speed exceeds a predetermined speed, the determination unit determines a driving assistance function to be the function having the high operation possibility, and outputs a signal corresponding to the driving assistance function, and, in response to the output of the signal, the control unit makes the driving assistance function operable, and switches on the light emitting portion associated with the driving assistance function.

4. A steering device for steering a vehicle, the steering device comprising:

a rim unit that is gripped at a time of steering;

a wheel unit that is located on an inner side of the rim unit;

a plurality of operation switches that are disposed on the wheel unit, each of the operation switches including a light emitting portion capable of being individually switched on and off, each of the operation switches being used for operating a function installed in the vehicle;

a design panel;

at least one processor and a memory coupled to the processor to store instructions that, when executed by the processor, cause the processor to function as:

an acquisition unit that acquires at least one piece of information among user's operation information, environment information, driving information, and vehicle position information;

a determination unit that determines a function having a high operation possibility, on a basis of information acquired by the acquisition unit; and a control unit that controls the light emitting portion, wherein the operation switches are individually operable via the design panel, the design panel includes a design surface that transmits light of the light emitting portion in an on-state and makes visibility of the light emitting portion in an off-state lower than visibility in the on-state, when the vehicle position information indicates that the vehicle has entered an expressway, the determination unit determines a driving assistance function to be the function having the high operation possibility, and outputs a signal corresponding to the driving assistance function, and, in response to the output of the signal, the control unit makes the driving assistance function operable, and switches on the light emitting portion associated with the driving assistance function.

* * * * *